(12) United States Patent
Kadatch

(10) Patent No.: US 7,343,037 B1
(45) Date of Patent: Mar. 11, 2008

(54) DYNAMIC, LOCALLY-ADAPTIVE, LOSSLESS PALETTIZATION OF COLOR AND GRAYSCALE IMAGES

(75) Inventor: Andrew Kadatch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 10/771,577

(22) Filed: Feb. 4, 2004

(51) Int. Cl.
*G06K 9/00* (2006.01)
(52) U.S. Cl. .................... 382/166; 382/244
(58) Field of Classification Search ........... 382/166
See application file for complete search history.

(56) References Cited

U.S. PATENT DOCUMENTS

| | | | |
|---|---|---|---|
| 5,787,471 A * | 7/1998 | Inoue et al. | ........... 711/133 |
| 6,233,017 B1 | 5/2001 | Chaddha | |
| 6,292,194 B1 | 9/2001 | Powell, III | |
| 6,337,881 B1 | 1/2002 | Chaddha | |
| 6,563,517 B1 | 5/2003 | Bhagwat et al. | |
| 2002/0001413 A1 * | 1/2002 | Ratnakar | ........... 382/240 |
| 2003/0189576 A1 * | 10/2003 | Pan et al. | ........... 345/589 |

OTHER PUBLICATIONS

Block address predictive colour quantisation image compression, L.-M. Po, W.-T. Tan; Electronics Letters, vol. 30, Iss.2, Jan. 20, 1994, pp. 120-121.*
JPEG 2000 options for document image compression, L.H. Sharpe II and B. Manns, Proc. SPIE Int. Soc. Opt. Eng. 4670, 167-173 (2001).*
JPEG 2000 coding of color-quantized images, A.J. Pinho and A.J.R. Neves; ICIP. Proc. of International Conference on Image Processing, vol. 2, Sep. 14-17, 2003, pp. II-181-4 vol. 3.*
An efficient color re-indexing scheme for palette-based compression, W. Zeng, J. Li, and S. Lei; Proc. of International Conference on Image Processing (ICIP), 2000, pp. 476-479 vol. 3, Vancouver, BC.*
Hardware efficient updating technique for LZW CODEC design, C. Su, C.-F. Yen, and J.-C. Yo; ISCAS, Proc. of IEEE International Symposium on Circuits and Systems, vol. 4, Jun. 9-12, 1997, pp. 2797-2800 vol. 4.*
The piecewise-constant image model, P.J. Ausbeck Jr., Proc. of the IEEE, vol. 88, Iss. 11, Nov. 2000, pp. 1779-1789.*

(Continued)

*Primary Examiner*—Brian Werner
*Assistant Examiner*—Farras Abdelnour
(74) *Attorney, Agent, or Firm*—Amin, Turocy & Calvin, LLP

(57) ABSTRACT

The present invention leverages a lossless pixel palettization scheme to locally compress portions of at least a two-dimensional image. This provides a lossless compression means with a compression ratio comparable with lossy compression means, allowing for efficient data transfers without loss of image information. By utilizing locally-adaptive palettization, two-dimensional pixel information can be exploited to increase compression performance. In one instance of the present invention, a locally-adaptive, lossless palettization scheme is utilized in conjunction with a one-dimensional compression scheme to yield a further increase in compression ratio. This allows for the exploitation of two-dimensional data information along with the further compression of information reduced to one dimension.

31 Claims, 12 Drawing Sheets

OTHER PUBLICATIONS

S. Saha and R. Vemuri. Adaptive Wavelet Coding of Multimedia Images. Proceedings of the 7th ACM International Conference on Multimedia, pp. 71-74, 1999.

B. Knutsson, H. Lu, J. Mogul, and B. Hopkins. Architecture and Performance of Server-directed Transcoding. ACM Transactions on Internet Technology, vol. 3 Issue 4, pp. 392-424, 2003.

H. Bekkouche and M. Barret. Adaptive multiresolution decomposition: application to lossless image compression. In Proc. Int. Conf. Acoustic, Speech and Signal Processing, 2002. 4 pages.

X. Wu, N. Memon, and K. Sayood. A context-based, adaptive, lossless /nearly-lossless coding scheme for continuous-tone images. Proposal for ISO compression standard. 1995. 33 pages.

* cited by examiner

DYNAMIC, LOCALLY-ADAPTIVE, LOSSLESS PALETTIZATION OF COLOR AND GRAYSCALE IMAGES

TECHNICAL FIELD

The present invention relates generally to image compression, and more particularly to systems and methods for dynamic, locally-adaptive, lossless palettization of color and grayscale images.

BACKGROUND OF THE INVENTION

The amount of information available via computers has dramatically increased with the widespread proliferation of computer networks, the Internet and digital storage means. With such increased amount of information has come the need to transmit information quickly and to store the information efficiently. Data compression is a technology that facilitates the effective transmitting and storing of information.

Data compression reduces an amount of space necessary to represent information and can be used for many information types. The demand for compression of digital information, including images, text, audio and video has been ever increasing. Typically, data compression is used with standard computer systems; however, other technologies make use of data compression such as, but not limited to, digital and satellite television as well as cellular/digital phones.

Data compression is important for several reasons. It allows information to be transmitted with less bandwidth and stored in less space than uncompressed data. As the demand for handling, transmitting and processing large amounts of information increases, the demand for compression of such data increases as well. Although storage device capacity has increased significantly, the demand for information has outpaced capacity advancements. For example, an uncompressed digital picture can require 5 megabytes of space whereas the same picture can be compressed without loss and require only 2.5 megabytes of space. Thus, data compression facilitates transferring larger amounts of information. Even with the increase of transmission rates, such as broadband, DSL, cable modem Internet and the like, transmission limits are easily reached with uncompressed information. For example, transmission of an uncompressed image over a DSL line can take ten minutes. However, the same image can be transmitted in about one minute when compressed, thus, providing a ten-fold gain in data throughput.

In general, there are two types of compression, lossless and lossy. Lossless compression allows exact original data to be recovered after compression, while lossy compression allows for data recovered after compression to differ from the original data. A tradeoff exists between the two compression modes in that lossy compression provides for a better compression ratio than lossless compression because some degree of data integrity compromise is tolerated. Lossless compression may be used, for example, when compressing critical text, because failure to reconstruct exactly the data can dramatically affect quality and readability of the text. Lossy compression can be used with pictures or non-critical text where a certain amount of distortion or noise is either acceptable or imperceptible to human senses.

For example, bi-level images are quite common in digital document processing because they offer the potential for a compact representation of black-and-white documents containing texts and drawings. In such images, their picture elements (pixels) can be seen as coming from a binary source (e.g., white="0" and black="1"). Since they usually contain a lot of white space and repeated ink patterns, one basic approach to efficiently encode such images is to scan them in raster order, e.g., from top to bottom and left to right, and encode each pixel via adaptive arithmetic coding (AC), whose state (or probability table) is controlled by a context formed by the values of the pixels in a small template enclosing previously encoded pixels. That idea is the basis of most modern bi-level image compression systems.

Typically, bi-level images, such as facsimile images, are usually transmitted utilizing the old CCITT standards T.4 and T.6, which are usually referred to as Group 3 and Group 4, respectively. G3 usually encodes images with a modified Huffman (MH) code (i.e., Huffman coding on runs of black or white pixels), and G4 uses "modified modified read" (MMR) coding. MH and MMR are not as efficient as context-adaptive AC, but are simpler to implement. Over time, G3 and G4 evolved to include encoding via JBIG (joint bi-level image group, also known as recommendation T.82). JBIG uses the context-adaptive AC, with adaptive templates and the efficient QM binary arithmetic encoder. The JBIG-2 standard extends JBIG by including pattern matching for text and halftone data, as well as soft pattern matching (SPM) for lossy encoding. The JB2 encoder is also based on SPM, but uses the Z-coder for binary encoding. JBIG, JBIG-2 and JB2 can provide a significant improvement in compression performance over G4.

High performance lossless image compression maintains the integrity of digital images. However, popular image compression technologies, such as JPEG and GIF compression technology are lossy in nature. The image is distorted in exchange for a higher compression ratio. In quality critical applications such as remote computer system monitoring, it is imperative to maintain the best image quality possible, i.e., the images should be compressed in a lossless fashion. Most lossless image compression approaches simply build upon a lossy image compression technique, and further compress the residue. The compression ratio of such approaches is often affected by the underlying lossy compression technique. Since the quantization noise in the lossy compression technique is difficult to model, the approaches usually lead to inefficiency in the lossless image compression. Moreover, it is also more complex, as it requires a base image compression technology and a residue compression technology. Some other approaches build the lossless image compression directly through a predictive filter and then compress the prediction residue. These approaches may achieve good compression ratio, however, it is not compatible with existing lossy image compression technology framework.

Data compression is especially applicable to remote computer system access. Remote login software allows a user to virtually operate another computer system via a remote location. This requires screen shots of the controlled computer to be displayed on the remote computer. Typically, remote accessing includes text, images and/or text and images. Decreasing file sizes of digital documents through compression allows more efficient utilization of a remote connection's bandwidth such as Internet bandwidth, thus allowing for faster transmission of more information and a reduction of network congestion. Reducing transmission times and increasing connectivity bandwidth efficiency are just some of the many significant benefits of compression technology.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to image compression, and more particularly to systems and methods for dynamic, locally-adaptive, lossless palettization of color and grayscale images. A lossless pixel palettization scheme is leveraged to locally compress portions of at least two-dimensional images. This provides a lossless compression means with a compression ratio comparable with lossy compression means, allowing for efficient data transfers without loss of image information. By utilizing locally-adaptive palettization, two-dimensional pixel information can be exploited to increase compression performance. In one instance of the present invention, a locally-adaptive, lossless palettization scheme is utilized in conjunction with a one-dimensional compression scheme to yield a further increase in compression ratio. This allows for the exploitation of two-dimensional data information along with the further compression of information reduced to one dimension. The utilization of the present invention provides benefits to users by reducing the number of servers required, cutting network traffic and related expenses down, and improving user experience and satisfaction.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
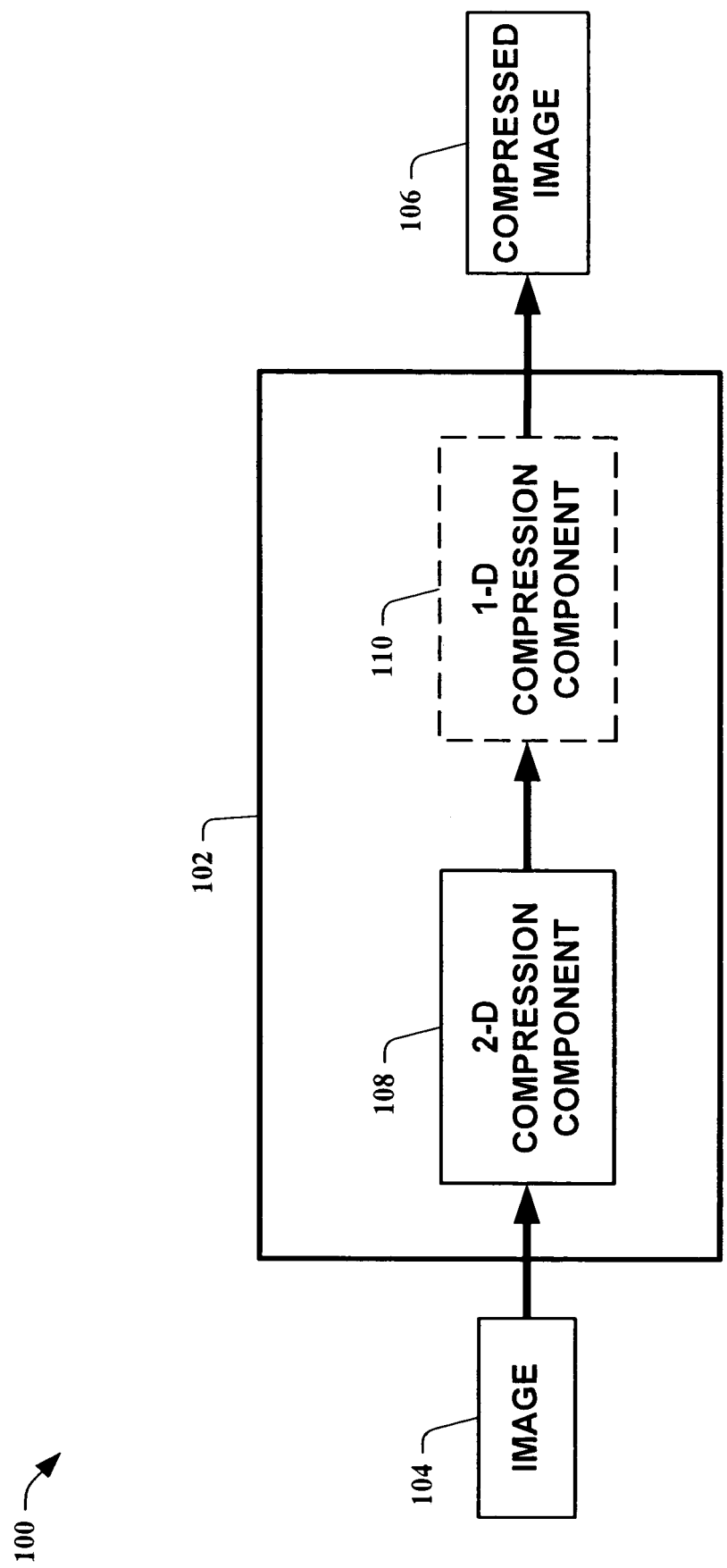
FIG. 1 is a block diagram of an image compression system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention consists of an N-dimensional engine, such as a two-dimensional engine for example, and an optional one-dimensional engine, where N represents any integer from one to infinity. In one instance of the present invention an image is processed with a two dimensional processing phase that efficiently discovers and utilizes/eliminates two-dimensional dependencies and redundancy found in an image. Then, optionally, the output of this processing phase is consumed by a general-purpose one dimensional compression engine (such as LZ77/LZ78) that eliminates any remaining redundancy in the image data. Although the present invention may not be as efficient as a dedicated image compression method, its simplicity (and thus computational efficiency, ease of implementation, and easily provable reliability) and good compatibility with existing implementations (essentially, it replaces run-length encoding (RLE) with another transformation) makes it much more attractive for practical purposes.

In recent years, two scenarios have become increasingly popular and widely utilized, namely: (a) accessing a remote ("master") computer via a network utilizing a local ("client") computer as a terminal. This scenario is exceptionally popular with large companies and institutions, enabling telecommuting and/or remote access from laptop and/or home machine to powerful and/or secure remote machines installed in corporate headquarters and/or large warehouse; and (b) using computers for educational purposes and training when teachers record their actions on a master computer that students may play on their home machines. In both cases, the client, essentially, utilizes a real-time "movie" consisting of computer screenshots taken at a sufficiently high frame rate (5-60 frames per second). Considering the fact that resolution of modern monitors is really large (from 800×600 to 1600×1200 pixels, i.e., 0.5-2 megapixels per screenshot), one of the most challenging problems faced by software providing remote access and/or facilitating session record/playback is efficient encoding of a screenshot sequence.

Though in many cases software can intercept activity performed by applications running on a master computer (e.g., "print letter A using 10 point Arial font at position 100,100") and replicate an effect of such activity on a client machine, in many cases it has to transfer images of a master machine screen (or parts of). Often, while waiting for user input, application programs prepare on-screen images of current page neighborhood (like previous and next page) in background memory and then just copy an in-memory representation onto the screen, so that when a user navigates to a next or previous page, visual representation of the page is ready and can be visualized instantaneously, thus substantially improving application response time.

Therefore, the task of encoding screenshot images is very important. It becomes even more complicated when all requirements are taken into consideration such as: (1) Encoding/decoding of screenshot images must be very efficient, both in terms of time (encoding/decoding latency and amount of processing power used) and space (size of encoded image and amount of memory required for encoding/decoding): encoding/decoding should be fast enough to do its job in real time without interfering with main tasks performed on master and client computers, it shall not use too much memory so that single remotely accessible machine could serve dozens and hundreds of remote users, and size of compressed image shall be small enough to be transferred over network with limited capacity in real time; and (2) Encoding/decoding shall be lossless—that is, decoded image shall always be exactly the same as encoded, because screenshot images often contain a lot of text and computer-generated elements that have sharp, crisp edges, sudden changes in brightness/color that all shall be preserved to ensure readability of text, easy recognition of familiar icons, etc.

Despite the fact that there are literally hundreds of known methods encoding still images, they are not applicable for given scenarios because: (1) Lossy image compression methods (e.g., JPEG, etc.) are heavily tuned toward compression of photographic images blurring sharp edges and removing/blurring small details. In addition, such methods cannot be used in real time systems because of their high computational complexity; (2) Modern lossless image compression methods (e.g., CALIC, JPEG-LS, etc.) are not suitable either because they too are too slow and, being tuned towards compression of photographic images, often do not handle highly redundant screenshot images; and (3) Obsolete lossless image compression methods (e.g., CCITT fax standards), work with highly redundant images well, but are suitable for only black-and-white images; quality of such compression dramatically diminishes on full-color and/or grayscale images.

Considering the very strong limitations on amount of processing power and memory available for image compression, until recently, the only available choice was a variation of LZ77/LZ78 general-purpose data compression that substitutes sequences of pixels with a pointer to a previous occurrence of the same sequence, probably preceded by some variation of RLE (Run Length Encoding substituting long runs of the same pixel with run count and pixel value). Those methods can be implemented very efficiently, use little memory, and provide acceptable compression ratio (LZ77/LZ78).

Though this approach works well, its major deficiency is caused by the fact that both underlying compression techniques (LZ77/LZ78 and RLE) can cope with single-dimensional data only and cannot efficiently utilize the knowledge of the two-dimensional nature of input data.

Therefore, the utilization of the present invention—which provides an implementation with similar efficiency—improves both encoding/decoding time and reduces the size of compressed data, improving user experiences, reducing network traffic (and, thus, cutting network infrastructure and cost of leased network lines), and increasing the number of users that can share the same remote server thus reducing number of expensive servers required.

In FIG. 1, a block diagram of an image compression system 100 in accordance with an aspect of the present invention is shown. The image compression system 100 is comprised of a palettization-based compression system 102 with an input image 104 and an output compressed image 106. The palettization-based compression system 102 is comprised of a two-dimensional compression component 108 and an optional one-dimensional compression component 110. The two-dimensional compression component 108 receives two-dimensional image data and utilizes two-dimensional data relationships to compress the image data utilizing a locally-adaptive, lossless palettization scheme. The compressed image data can then be further compressed by the optional one-dimensional compression component to yield compression ratios similar to lossy compression schemes without any loss in image data.

Figure 2:
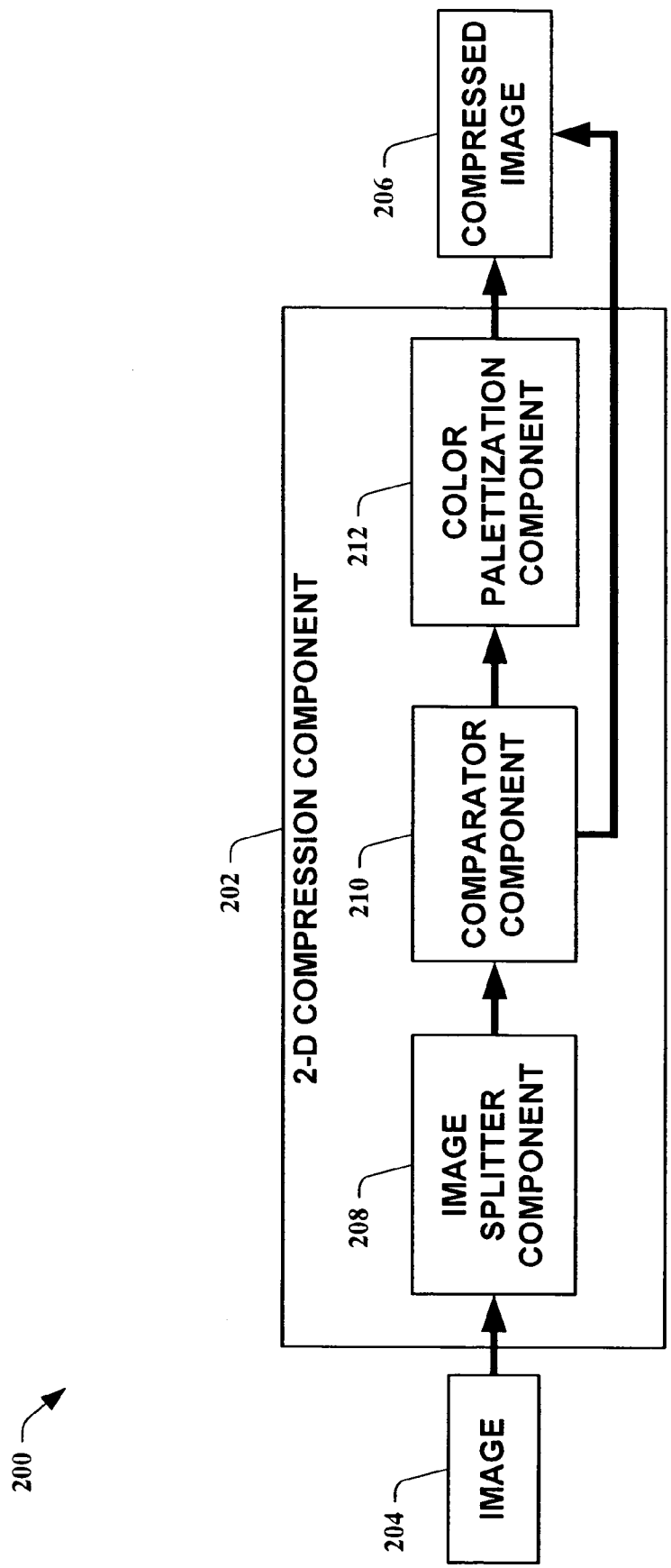
FIG. 2 is a block diagram of a palettization-based compression system in accordance with an aspect of the present invention.

Referring to FIG. 2, a block diagram of a palettization-based compression system 200 in accordance with an aspect of the present invention is depicted. The palettization-based compression system 200 is comprised of a two-dimensional compression component 202 with an input image 204 and an output compressed image 206. The two-dimensional compression component 202 is comprised of an image splitter component 208, a comparator component 210, and a color palettization component 212. The image splitter component 208 receives the image 204 and divides (i.e., splits) the image 204 into smaller portions (i.e., "macroblocks") such as, for example, 8×32 pixel rectangles and the like. The splitting of the image 204 into smaller portions permits the two-dimensional compression component 202 to exploit/adapt to local color/grayscale changes rather than encoding the image 204 as a whole. This permits greater compression than would otherwise be obtainable. The comparator component 210 compares each macroblock to determine if a current macroblock is identical to a previous macroblock. If a match is found, it can be exploited by encoding a single bit to identify that the current macroblock is identical to the previous macroblock. This data can be output as part of the data of the compressed image 206. Similarly, lines of a macroblock can be compared to determine if they are also identical to previous lines. A single bit can indicate that the current line is identical to the previous line. In the same manner, matching pixels and/or pixel sequences can be encoded with a single bit as well. The color palettization component 212 receives macroblocks containing "colors"

(the term "colors" when used hereafter is meant to include both colors and grayscales) to be encoded. Typically, if the amount of new colors not represented in a color palette exceeds a threshold value, the macroblock is sent "as is" without being palletized. However, if the colors are less than (or possibly equal to) a threshold value, the colors are palletized (i.e., encoded based upon an index that points to a particular color/grayscale). By utilizing splitting, comparing, and palletizing, the present invention yields significant gains in compressing the image 204.

Figure 3:
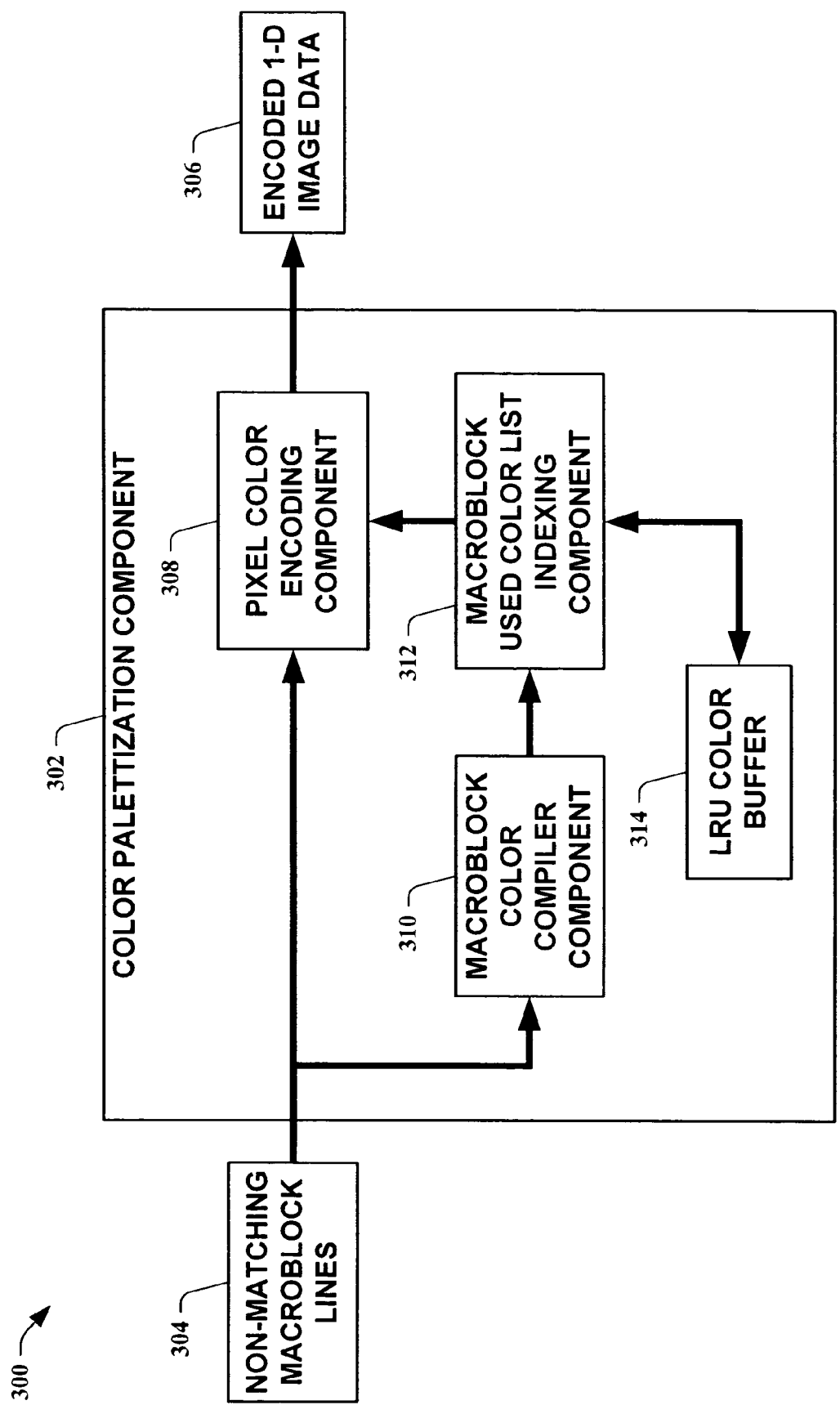
FIG. 3 is a block diagram of a two-dimensional compression component in accordance with an aspect of the present invention.

Looking at FIG. 3, a block diagram of a two-dimensional compression component 300 in accordance with an aspect of the present invention is illustrated. The two-dimensional compression component 300 is comprised of a color palettization component 302 with an input of non-matching macroblock lines 304 and an output of encoded one-dimensional image data 306. The color palettization component 302 is comprised of a pixel color encoding component 308, a macroblock color compiler component 310, a macroblock used color list indexing component 312, and an LRU (Last Recently Used) color buffer 314. The macroblock color compiler 310 determines what colors are utilized in the non-matching macroblock lines 304 and passes the color information to the macroblock used color list indexing component 312 where they are added to the used color list if required. The macroblock used color list indexing component 312 provides index values for each color that is utilized in the non-matching macroblock lines 304. If at all possible, the macroblock used color list indexing component 312 employs index values for the utilized colors from the LRU color buffer 314. If the color index values are not available from the LRU color buffer 314, the colors are added to the used color list and index values are then assigned to the new colors. With each iteration of color checks, the new colors are added to the LRU color buffer 314 so that commonly used colors are easily indexed from the LRU color buffer 314. The pixel color encoding component 308 receives the non-matching macroblock lines 304 from an image and encodes them according to the color index values provided via the macroblock used color list indexing component 312. The data becomes the encoded one-dimensional image data 306. In other instances of the present invention, the one-dimensional image data 306 can be further compressed to yield an optimum compression ratio. Such compression can be facilitated by ordering and sequencing index values and other information derived from the palettization component. The number of bits utilized for the index values can be decreased as the information represented by the index values requires fewer bits to be identifiable. Grouping sequences of line bits and macroblock colors can also facilitate in further compression of the image data. Generally speaking, the fewer the number of colors, the fewer the required number of bits that is necessary to transmit.

As stated supra, the present invention utilizes an N-dimensional scheme, such as, for example, a two-dimensional scheme, with an optional one-dimensional process for further compression if desired. In a two-phase instance of the present invention, an image is first preprocessed with a two-dimensional preprocessing phase that efficiently discovers and utilizes/eliminates two-dimensional dependencies and redundancy. Then, an output of preprocessing phase is consumed by a general-purpose one dimensional compression engine (e.g., such as LZ77/LZ78) that eliminates remaining redundancy. As stated earlier, although such a solution may not be as efficient as a dedicated image compression scheme, its simplicity (and thus computational efficiency, ease of implementation, and easily provable reliability) and good compatibility with existing implementations make it much more attractive for practical purposes.

The present invention provides efficient utilization of a two-dimensional nature of input images, efficient handling of multi-color and grayscale images, and efficient utilization of the fact that input images are highly redundant, being mostly composed out of rendered textual data. The present invention provides these aspects via a dynamic, locally-adaptive palettization scheme with embedded two-dimensional variant of run-length encoding. Encoding starts from initializing an LRU (Last Recently Used) buffer that can hold up to L pixels, where L is implementation-dependent (e.g., an instance of the present invention utilizes an implementation with L=256). An input image is split into a sequence of macroblocks each consisting of M×O pixels (e.g., an instance of the present invention uses 8×32 pixel macroblocks). Then, each macroblock is encoded by traversing first line-by-line and then each line pixel-by-pixel so that if a current macroblock line is identical to a previous line, this fact is identified by setting a respective bit in the list of "same line" bit masks. If a current macroblock line is different from a previous one, it is traversed pixel-by-pixel and a list of all pixel colors utilized by non-matching lines of the macroblocks is created. If the number of such colors exceeds a certain threshold, a macroblock is encoded "as-is." Otherwise, the list of used colors is encoded utilizing, whenever possible, an index in the LRU pixel color buffer instead of encoding an actual color, and then the sequence of all pixels from all non-matching macroblock lines are encoded by substituting pixel color with its index in the used color list. Finally, colors from the used color list are added to the LRU buffer.

Figure 4:
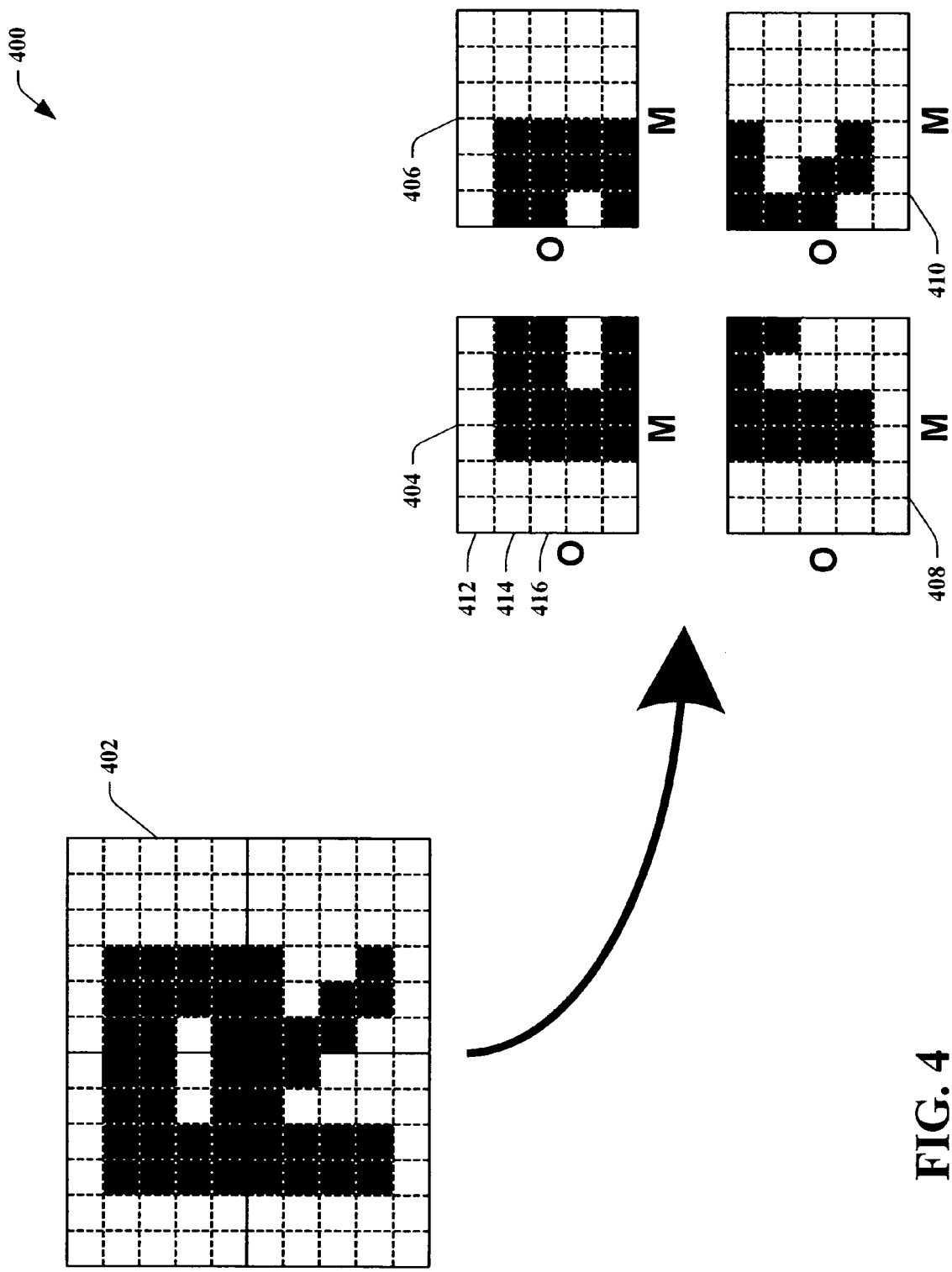
FIG. 4 is an illustration of image splitting utilizing an image compression system in accordance with an aspect of the present invention.

In FIG. 4, an illustration 400 of image splitting utilizing an image compression system in accordance with an aspect of the present invention is shown. An image 402 is split into four image portions 404-410. These portions 404-410 permit a line-by-line assessment of each image portion or "macroblock." In this example, a comparison can be made between lines denoted by 412, 414, and 416. From the illustration 400, it is evident that line 412 differs from lines 414 and 416. It is also evident that lines 414 and 416 have identical pixel orientation and color. Thus, once line 414 is encoded, line 416 only requires a one-bit flag, for example, to encode its line when compared to the previous line 414. This takes advantage of two-dimensional redundancy and further increases compression of the image 402.

Figure 5:
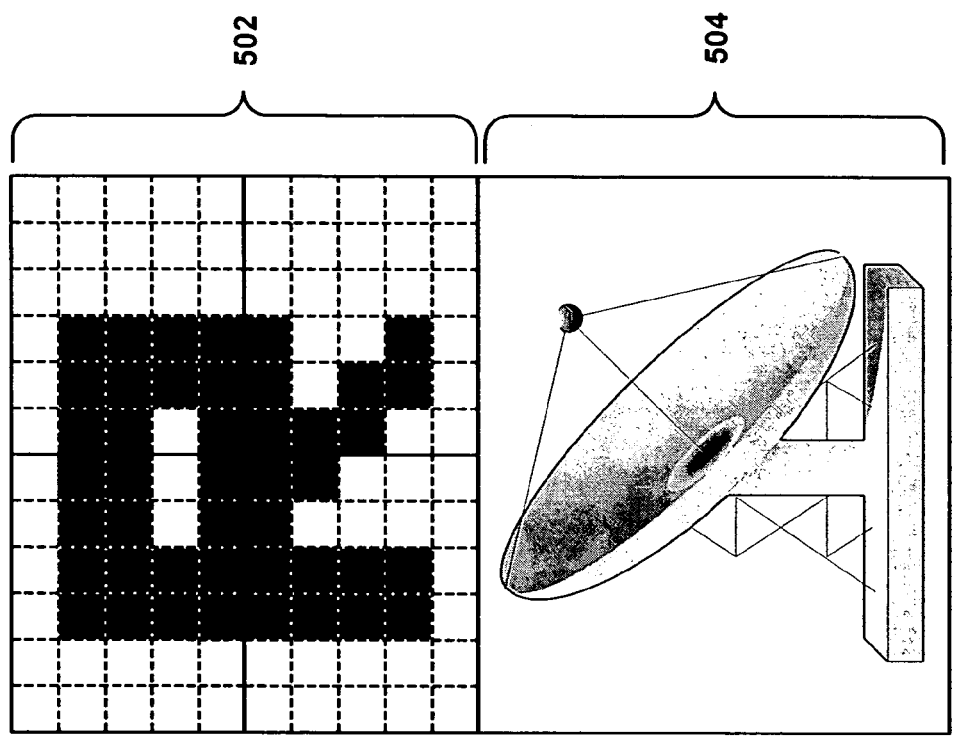
FIG. 5 is an illustration of a macroblock in accordance with an aspect of the present invention.

Turning to FIG. 5, an illustration of a macroblock 500 in accordance with an aspect of the present invention is depicted. The macroblock 500 is comprised of a simple image portion 502 and a complex image portion 504. In this instance of the present invention, the macroblock 500 can be further split into two sub-macroblocks to facilitate image compression. The simple image portion 502 is readily compressed utilizing the present invention while the complex image portion 504 might be sent "as is." By splitting the macroblock 500 into smaller portions, an image can still be compressed despite containing a complex image portion.

Figure 6:
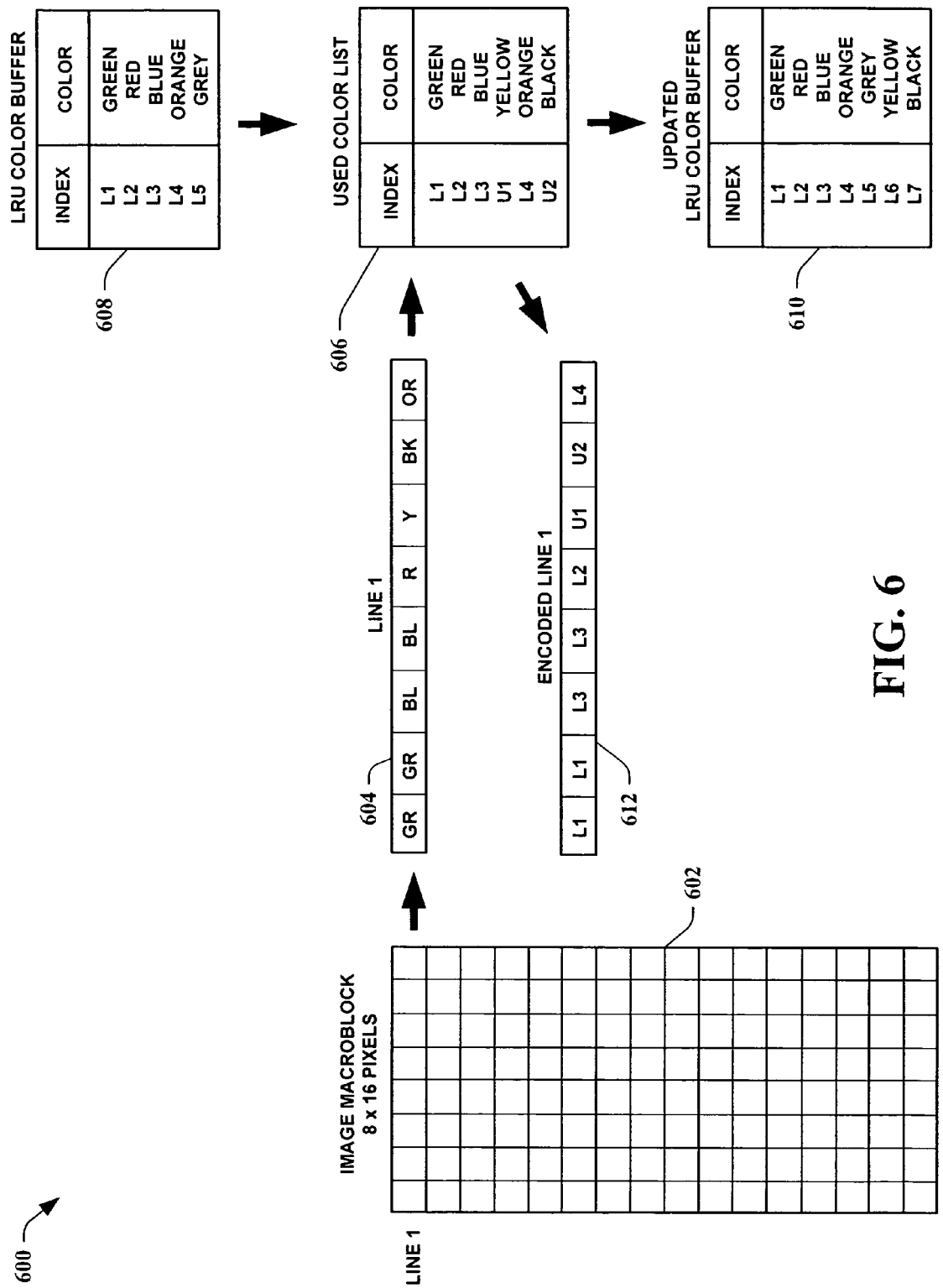
FIG. 6 is an image encoding example in accordance with an aspect of the present invention.

Referring to FIG. 6, an image-encoding example 600 in accordance with an aspect of the present invention is illustrated. In this example 600 of an instance of the present invention, line 1 604 of a 8×16 pixel macroblock 602 is being encoded. Line 1 604 is illustrated as a sequence of pixel colors, namely green, green, blue, blue, red, yellow, black, and orange. Rather than encoding each of these colors utilizing a 24 bit color value, the colors are referenced in a used color list 606 that is compiled of all the colors used in the macroblock. To encode line 1 604, each color is replaced with its index value from the used color list 606. The used color list 606 is comprised of index values from an LRU color buffer 608 to the extent possible. For remaining colors not found in the LRU color buffer 608, they are indexed according to the used color list 606. These used color list indices are represented in the example 600 as "U" index values. Index values obtained from the LRU color buffer 608 are denoted by "L" index values. Thus, line 1 604, for example, is encoded by replacing green with "L1," blue with "L3," red with "L2," yellow with "U1," black with "U2," and orange with "L4." This yields encoded line 1 612. When the LRU color buffer 608 does not coincide with the used color list 606, additional colors are sent to the LRU color buffer 608 to yield an updated LRU color buffer 610. In this manner, commonly used colors are kept current in an LRU color buffer. One skilled in the art will recognize that "L" and "U" index values utilized in the above example are only meant to represent a system of indexing and these specific indicators are not meant to be the only solution. Typically, an index value will give a number indicative of a particular color in a color palette. The fewer the colors in the palette, the fewer the bits required for the index value, and, thus, the greater the compression.

Figure 7:
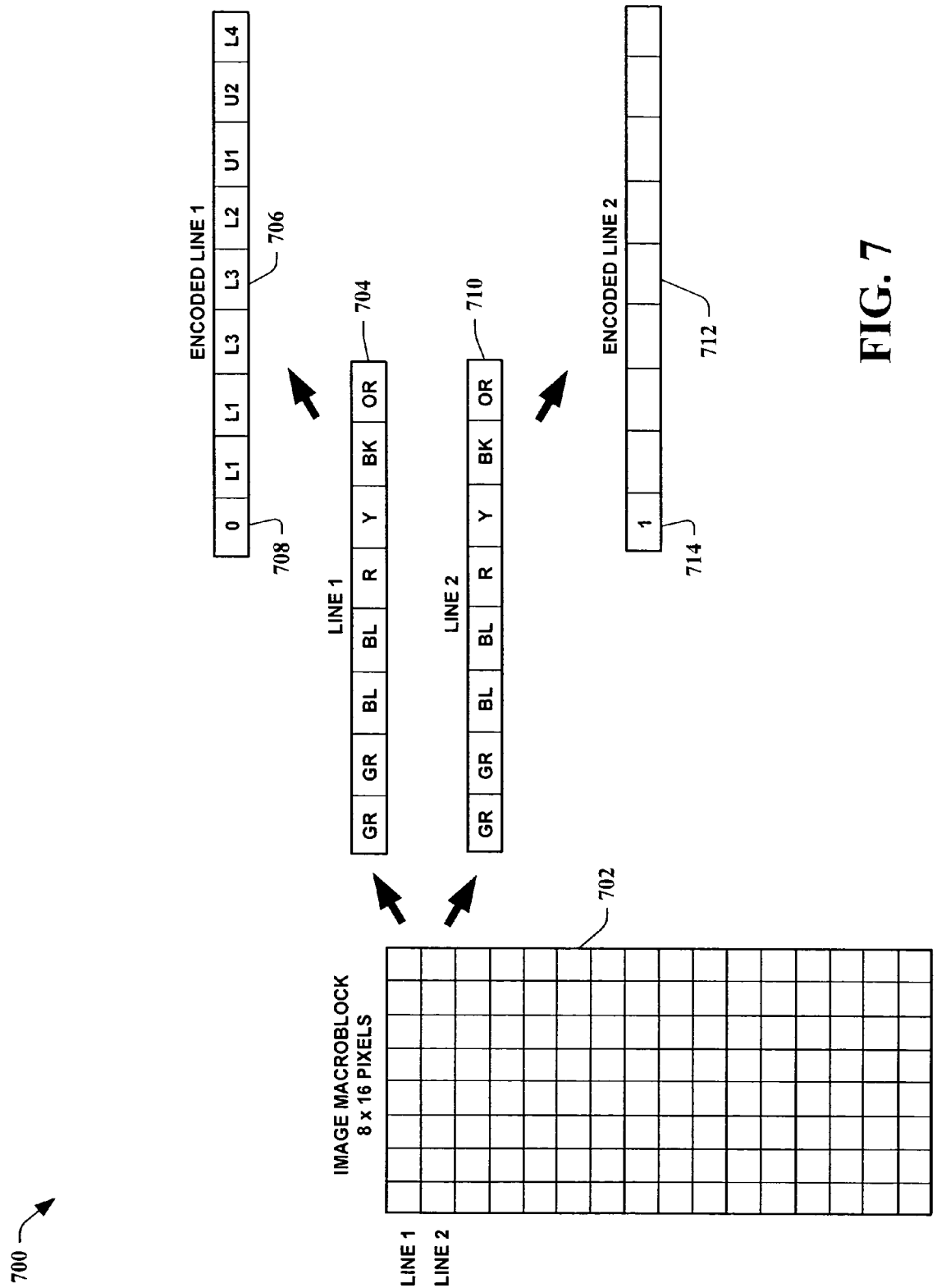
FIG. 7 is another image encoding example in accordance with an aspect of the present invention.

Moving on to FIG. 7, another image encoding example 700 in accordance with an aspect of the present invention is shown. In this example 700, line 1 704 and line 2 710 of an image macroblock 702 are being encoded via an instance of the present invention. Line 1 704 and line 2 710 contain the same color pixel sequence, namely green, green, blue, blue, red, yellow, black, and orange. The present invention encodes line 1 704 as illustrated previously in FIG. 6. An additional line 1 bit 708 is shown in encoded line 1 706 as a flag to indicate whether this line of the macroblock 702 matches a previous line. In this example, it is set to "0" to indicate a non-match. Line 2 710 is identical to line 1 704 and, thus, the present invention takes advantage of this redundancy by utilizing a single bit 714 to indicate that line 2 710 matches line 1 704. Thus, an encoded line 2 712 for the line 2 710 contains only the single bit 714 set to a value of "1" to indicate a redundancy in lines. This dramatically reduces the number of required bits that need to be sent, yielding a large increase in compression ratios.

The employment of such dynamic, locally-adaptive palettization (i.e., replacement of pixel colors with indices in a list of used colors) very efficiently handles all specific properties of input images. The two-dimensional nature and high redundancy of an input image is efficiently handled by removing entire macroblock lines that match with a previous line and replacing them with only one bit. The large image color space is efficiently encoded by replacement of a pixel color with its index in the list of colors used in a current macroblock. When dealing with screenshots, a majority of macroblocks contain only a few (e.g., 1-16) different colors and, thus, each pixel can be encoded using only 1-4 bits instead of 16-32 bits occupied by a full pixel color. The correlation between macroblocks (e.g., black text on white background will likely be followed by black text on white background) is efficiently handled by an LRU buffer and replacement of colors that are already in the LRU buffer with their indices, so that current macroblock colors used by recently processed macroblocks (e.g., a previous one) can also be encoded very efficiently. Because of the relatively high compression ratio (e.g., 20:1 on average), the amount of data that an optional second stage of processing needs to encode is reduced dramatically, thus substantially improving overall encoding speed. Exposing the internal structures to a second stage of processing by storing homogeneous data streams together, noticeably improves overall compression ratio and speed.

Additionally, in the special case when all non-matching lines (that are encoded) of a macroblock consist of only one color, it is unnecessary to encode the color of each pixel in a line. For example, each line is either the same as the previous line (as denoted in the "same line" bit map), and, thus, all that is needed is to copy the previous line to restore the current line; or, if the bit map indicates that the current line differs from the previous line and all pixels are of a single color (otherwise, there would be more than one color "used" by the macroblock), all pixels of the current line need to be set to the only color that was found during processing of the current macroblock. Moreover, in this case, the sequence of the "same line" bits corresponding to the lines of the "only one used color" macroblock has only one "not the same as previous line" bit.

Figure 8:
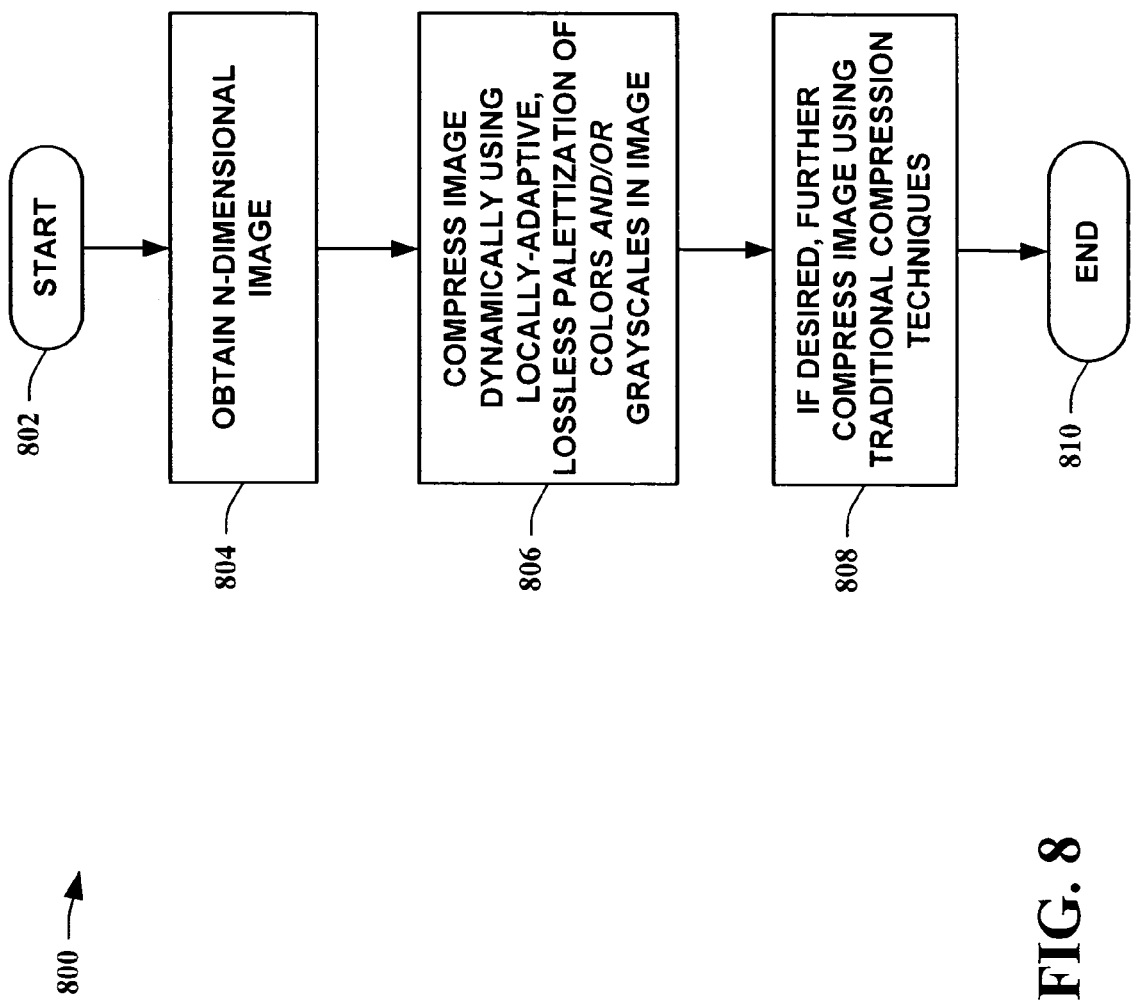
FIG. 8 is a flow diagram of a method of compressing an image in accordance with an aspect of the present invention.
Figure 9:
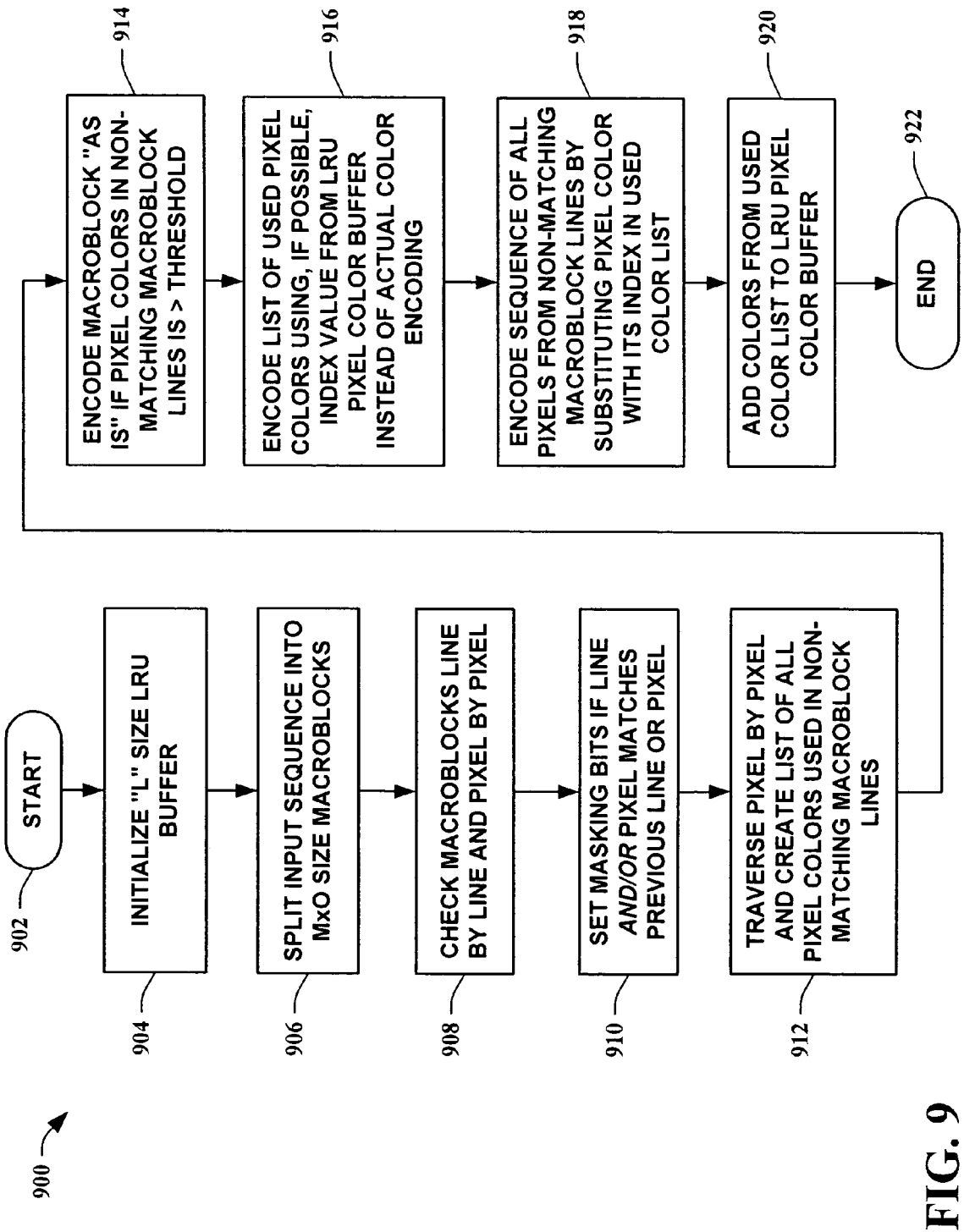
FIG. 9 is another flow diagram of a method of compressing an image in accordance with an aspect of the present invention.

In view of the exemplary systems shown and described above, methodologies that may be implemented in accordance with the present invention will be better appreciated with reference to the flow charts of FIGS. 8-9. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 8, a flow diagram of a method 800 of compressing an image in accordance with an aspect of the present invention is depicted. The method 800 starts 802 by obtaining an N-dimensional image 804, where N represents any integer from one to infinity. The method 800 readily exploits two-dimensional image relationships and can be extended to apply to greater than two dimensions by taking advantage of information relating the dimensions at a local level. Dimensional information can then be related and redundancies eliminated to yield a compressed image. Further compression can be obtained by relating the reduced dimensions to other reduced dimensions to facilitate in further compression. Once the image has been obtained, the image is compressed dynamically utilizing a locally-adaptive, lossless palettization (i.e., replacement of pixel colors/grayscales with indices in a list of used colors/grayscales) of colors and/or grayscales in the image 806. Removing entire local macroblock lines that match with a previous line and replacing them with only one bit efficiently handles the N-dimensional nature and high redundancy of an input image. Likewise, entire local matching macroblocks can be replaced with one bit. The large image color/grayscale space is efficiently encoded by replacement of a pixel color/grayscale with its index in the list of colors/grayscales utilized in a current macroblock. If desired, further compression of the image can be obtained by utilizing traditional compression techniques after the locally-adaptive, lossless palettization 808, ending the flow 810. For example, a general-purpose, one-dimensional compression engine (e.g., such as LZ77/LZ78) further compresses the lossless palettization output by eliminating any remaining redundancy. Additionally, such compression can be facilitated by ordering and sequencing index values and other information derived from the lossless palettization. The number of bits utilized for the index values can also be decreased, as the information represented by the index values requires fewer bits to be identifiable. Grouping sequences of line bits and macroblock colors can also facilitate in further compression of the image data. Generally speaking, the fewer the number of colors, the fewer the required number of bits that is necessary to transmit information.

Turning to FIG. 9, another flow diagram of a method 900 of compressing an image in accordance with an aspect of the present invention is illustrated. The method 900 starts 902 by initializing a Last Recently Used (LRU) color buffer of size "L" 904. This buffer is utilized for facilitating in indexing colors commonly used in an image. An input image is then split into M×O macroblocks 906. This allows the present invention to be locally-adaptive in application of its functions. Each macroblock is then checked line-by-line and pixel-by-pixel for color/grayscale data 908. This facilitates in reducing redundancies if patterns are located. Masking bits are then set if a line and/or pixel matches a previous line and/or pixel 910. This helps compress the image further by eliminating redundant data. Each line of a macroblock is traversed pixel-by-pixel to create a list of all pixel colors utilized in non-matching macroblock lines 912. If non-matching macroblock lines exceed a threshold value for a number of pixel colors/grayscales, the macroblock is encoded "as is" 914. The list of used pixel colors is then encoded (e.g., indexed) utilizing, if possible, index values from the LRU color buffer instead of encoding the color itself 916. The sequence of all pixels from non-matching macroblock lines is encoded utilizing an index value from the used color list rather than the encoded color value itself 918. Colors not found in the LRU color buffer are then added from the used color list 920, ending the flow 922.

Figure 10:
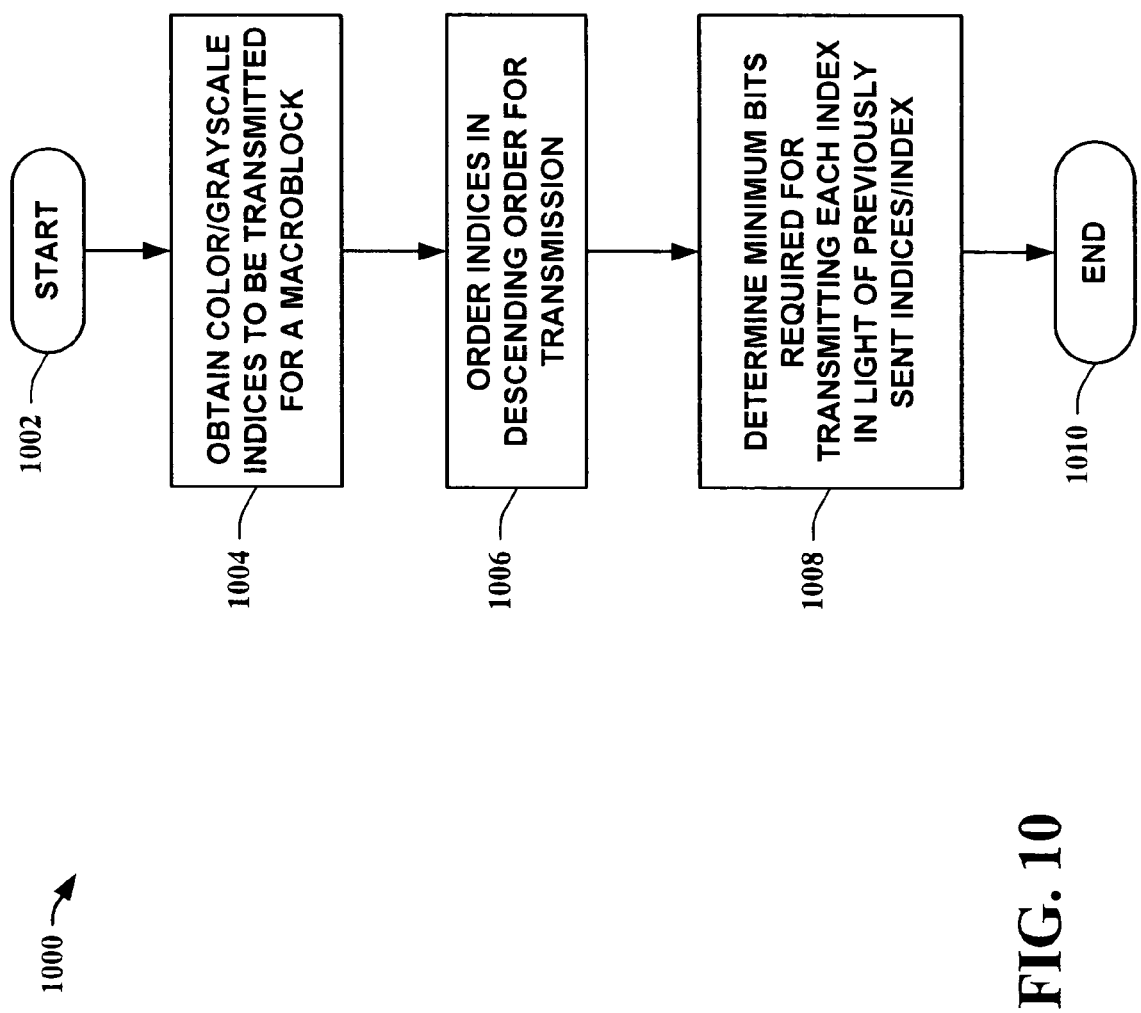
FIG. 10 is a flow diagram of a method of transmitting indices in accordance with an aspect of the present invention.

In FIG. 10, a flow diagram of a method 1000 of transmitting indices in accordance with an aspect of the present invention is shown. The method 1000 starts 1002 by obtaining color and/or grayscale indices to be transmitted for a macroblock 1004. Typically, a macroblock does not contain every available color in an LRU list. Thus, only a subset, k, of a total number, L, of color/grayscale indices in the LRU list is transmitted. The macroblock indices are then ordered in descending order to facilitate transmission of the indices 1006. Ordering the indices allows for exploitation of values of the indices for reducing transmission traffic (i.e., further compression). A minimum number of required transmission bits is then determined for transmitting each index in light of a previously sent index and/or indices 1008, ending the flow 1010. The determination is accomplished by calculating a range of appropriate values for a value, y, of a next index to be transmitted. Let m denote a number of previously transmitted indices, n denote a value of a last index transmitted, z denote a number of indices yet to be transmitted, and R denote a highest possible number of index choices that could represent y given a possible range of values for y. Since $y \leq n-1$ (limited at an upper boundary by a value of a last index transmitted minus 1) and also $y \geq z-1$ (limited at a lower boundary by a total of a sequential count incremented by 1 for each remaining index yet to be transmitted), the range is given by:

$$z-1 \leq y \leq n-1; \quad \text{(Eq. 1)}$$

and since z=k−m (the number of total indices for the macroblock minus the number of previously transmitted indices):

$$k-m-1 \leq y \leq n-1; \quad \text{(Eq. 2)}$$

Therefore, the highest number of index choices, R, that could represent y given the possible range of values for y is:

$$R=n-(k-m-1)=n+m-k+1; \quad \text{(Eq. 3)}$$

Thus, a minimum number of bits required to transmit y is given by:

$$\text{bit count}=\log_2(R)=\log_2(n+m-k+1) \quad \text{Eq. (4)}$$

For example, given a macroblock that utilizes k colors from an LRU list containing L entries (where, L=200 and k=4 colors with index values of L0=0, L1=1, L2=3, L3=6). Thus, k indices (e.g., 0, 1, 3, 6) need to be transmitted to an LRU table. The index values can be encoded utilizing two bits for the index values, such as, for example, 00=L0, 01=L1, 10=L2, and 11=L3, that a decoder can interpret (i.e., the decoder understands what "10" means (e.g., it's the 4th color stored in the LRU table, etc.)). First, transmit LRU indices in descending order (e.g., 6, 3, 1, 0). Second, utilize the following optimization: if m indices are read and a last index was n, then a next index cannot be greater than (n−1). As stated previously, there are z=(k−m) indices to transmit, therefore, the next index is (k−m−1) or greater because the remaining indices are at least 0, 1, . . . , (k−m−1). Therefore, the next index is in a range of [(n−1), (k−m−1)] inclusively. Thus, $\log_2$ (n+m−k+1) bits are sufficient to transmit the next index.

In this example, initially the decoder knows that an LRU table holds 200 colors, so a first index can be any number in a range from 0 to 199. Thus, a minimum of $\log_2$ (200)=8 bits is needed to transmit the first index. Therefore, the first index value of "6" is encoded utilizing 8 bits. This leaves three indices remaining, the next index is at most 5 and at least 2 (i.e., it can be only 2, 3, 4, or 5). In order to transmit one possible value out of four, exactly two bits are needed. Therefore, an actual index value less a minimal possible index value, 5−2="3," is transmitted utilizing two bits only. Then, the next index is, at most, a value of "4" and at least a value of "1" (i.e., it can only be 1, 2, 3, or 4). Similarly, two bits are sufficient for the next transmission, and, thus, 1−1="0" is transmitted utilizing two bits.

Finally, it is known that the last index is n=1, and there exists only (m−k)=1 index left to transmit. However, since the decoder knows that the remaining index is at most (n−1)=0 and at least (m−k−1)=0, the value of the last index is "0." Therefore, there is no need to transmit and/or decode anything in this case. More generally, once n equals (m−k), the remaining indices are (m−k−1), (m−k−2), . . . , 0. Thus, in this typical example, four indices are transmitted utilizing 8+2+2+0=12 bits; without this optimization, 8×4=32 bits would be required. Thus, the present invention enables even further compression utilizing this optimization technique.

Figure 11:
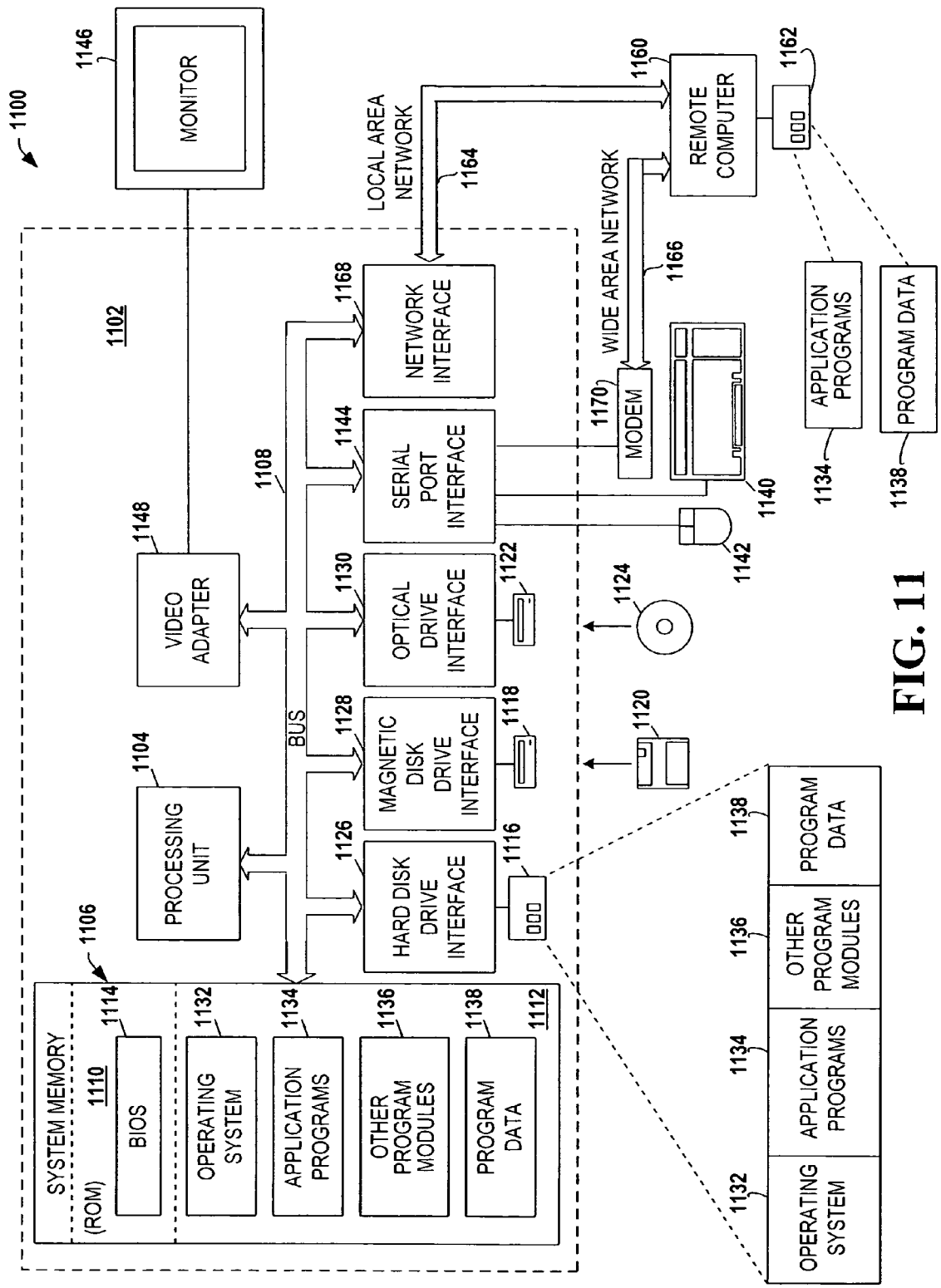
FIG. 11 illustrates an example operating environment in which the present invention can function.

In order to provide additional context for implementing various aspects of the present invention, FIG. 11 and the following discussion is intended to provide a brief, general description of a suitable computing environment 1100 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 11, an exemplary system environment 1100 for implementing the various aspects of the invention includes a conventional computer 1102, including a processing unit 1104, a system memory 1106, and a system bus 1108 that couples various system components, including the system memory 1106, to the processing unit 1104. The processing unit 1104 may be any commercially available or proprietary processor. In addition, the processing unit 1104 may be implemented as multi-processor formed of more than one processor, such as may be connected in parallel.

The system bus 1108 may be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1110 and random access memory (RAM) 1112. A basic input/output system (BIOS) 1114, containing the basic routines that help to transfer information between elements within the computer 1102, such as during start-up, is stored in ROM 1110.

The computer 1102 also may include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1100, and further that any such media may contain computer-executable instructions for performing the methods of the present invention.

A number of program modules may be stored in the drives 1116-1122 and RAM 1112, including an operating system 1132, one or more application programs 1134, other program modules 1136, and program data 1138. The operating system 1132 may be any suitable operating system or combination of operating systems. By way of example, the application programs 1134 and program modules 1136 can include a locally-adaptive, lossless palettization compression scheme in accordance with an aspect of the present invention.

A user can enter commands and information into the computer 1102 through one or more user input devices, such as a keyboard 1140 and a pointing device (e.g., a mouse 1142). Other input devices (not shown) may include a microphone, a joystick, a game pad, a satellite dish, wireless remote, a scanner, or the like. These and other input devices are often connected to the processing unit 1104 through a serial port interface 1144 that is coupled to the system bus 1108, but may be connected by other interfaces, such as a parallel port, a game port or a universal serial bus (USB). A monitor 1146 or other type of display device is also connected to the system bus 1108 via an interface, such as a video adapter 1148. In addition to the monitor 1146, the computer 1102 may include other peripheral output devices (not shown), such as speakers, printers, etc.

It is to be appreciated that the computer 1102 can operate in a networked environment using logical connections to one or more remote computers 1160. The remote computer 1160 may be a workstation, a server computer, a router, a peer device or other common network node, and typically includes many or all of the elements described relative to the computer 1102, although, for purposes of brevity, only a memory storage device 1162 is illustrated in FIG. 11. The logical connections depicted in FIG. 11 can include a local area network (LAN) 1164 and a wide area network (WAN) 1166. Such networking environments are commonplace in offices, enterprise-wide computer networks, intranets and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, or is connected to a communications server on the LAN, or has other means for establishing communications over the WAN 1166, such as the Internet. The modem 1170, which can be internal or external relative to the computer 1102, is connected to the system bus 1108 via the serial port interface 1144. In a networked environment, program modules (including application programs 1134) and/or program data 1138 can be stored in the remote memory storage device 1162. It will be appreciated that the network connections shown are exemplary, and other means (e.g., wired or wireless) of establishing a communications link between the computers 1102 and 1160 can be used when carrying out an aspect of the present invention.

In accordance with the practices of persons skilled in the art of computer programming, the present invention has been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1116, floppy disks 1120, CD-ROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

Figure 12:
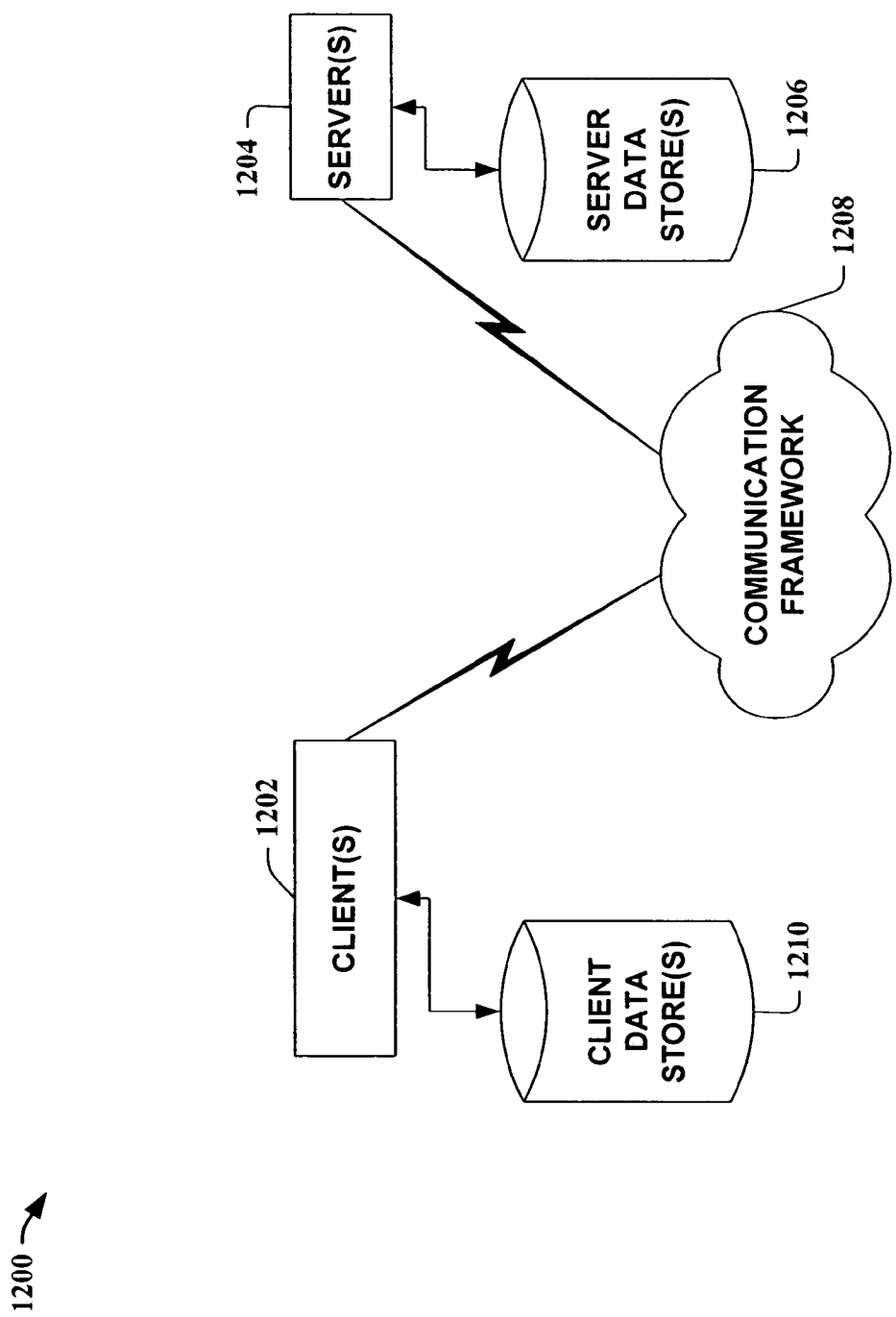
FIG. 12 illustrates another example operating environment in which the present invention can function.

FIG. 12 is another block diagram of a sample computing environment 1200 with which the present invention can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). The server(s) 1204 can house threads to perform transformations by employing the present invention, for example. One possible communication between a client 1202 and a server 1204 may be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

In one instance of the present invention, a data packet transmitted between two or more computer components that facilitates image compression is comprised of, at least in part, information relating to an image compression system that utilizes, at least in part, locally-adaptive, lossless palettization to facilitate image compression.

It is to be appreciated that the systems and/or methods of the present invention can be utilized in image compression facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates data compression, comprising the following computer executable components:

a processor that receives an N-dimensional image, where N is any integer from one to infinity; and The processor executing a compression component that utilizes, at least in part, locally-adaptive, lossless palettization to facilitate compression of the N-dimensional image, wherein the lossless palettization comprises: initializing an L size last recently used (LRU) buffer; splitting the N-dimensional image into M×O size macroblocks, where M and O each represent any integer from one to infinity; checking each macroblock line-by-line and pixel-by-pixel; setting masking bits if a line matches a previous line; setting masking bits if a pixel matches a previous pixel; creating a list of all pixel characteristics utilized in non-matching macroblock lines; encoding macroblock lines "as is" if pixel characteristics in non-matching macroblock lines is greater than a threshold value related to the pixel characteristics; encoding a list of used pixel characteristics utilizing, if possible, an index value from the LRU buffer instead of actual characteristic encoding; encoding a sequence of all pixels from non-matching macroblock lines by substituting pixel characteristics with its index value from the list of used pixel characteristics; and adding pixel characteristics from the list of used pixel characteristics to the LRU buffer.

2. The system of claim 1, the N-dimensional image comprising a two-dimensional image.

3. The system of claim 1, the compression component employing the locally-adaptive, lossless palettization when characteristics of image data related to the N-dimensional image are equal to or below a threshold value.

4. The system of claim 3, the characteristics of the image data comprising at least one selected from the group consisting of pixel colors and pixel grayscales.

5. The system of claim 4, the threshold value comprising a maximum number of at least one selected from the group consisting of pixel colors and pixel grayscales.

6. The system of claim 1, the compression component optimizing compression of the N-dimensional image by ordering indices representative of image data and reducing indices bit counts as values of indices decrease.

7. The system of claim 1, the compression component further utilizing a one-dimensional compression technique to further compress the N-dimensional image.

8. The system of claim 7, the one-dimensional technique comprising at least one selected from the group consisting of LZ77 compression and LZ78 compression.

9. The system of claim 1, the locally-adaptive, lossless palettization comprising, at least in part, splitting the N-dimensional image into macroblocks.

10. The system of claim 9, the locally-adaptive, lossless palettization further comprising, at least in part, further splitting the macroblocks to facilitate compression.

11. The system of claim 1, the locally-adaptive, lossless palettization further comprising a last recently used (LRU) buffer for indexing image data.

12. The system of claim 11, the LRU buffer maintains image data in relative order to facilitate further compression.

13. The system of claim 1, the locally-adaptive, lossless palettization comprising dynamic, locally-adaptive, palettization.

14. A computer-executable method for facilitating data compression, comprising:

receiving an N-dimensional image, where N is any integer from one to infinity; and utilizing, at least in part, locally-adaptive, lossless palettization to facilitate compression of the N-dimensional image wherein, the lossless palettization comprises initializing an L size last recently used (LRU) buffer;

splitting the N-dimensional image into M×O size macroblocks, where M and O each represent any integer from one to infinity;

checking each macroblock line-by-line and pixel-by-pixel;
setting masking bits if a line matches a previous line;
setting masking bits if a pixel matches a previous pixel;
creating a list of all pixel characteristics utilized in non-matching macroblock lines;
encoding macroblock lines "as is" if pixel characteristics in non-matching macroblock lines is greater than a threshold value related to the pixel characteristics;
encoding a list of used pixel characteristics utilizing, if possible, an index value from the LRU buffer instead of actual characteristic encoding;
encoding a sequence of all pixels from non-matching macroblock lines by substituting pixel characteristics with its index value from the list of used pixel characteristics; and
adding pixel characteristics from the list of used pixel characteristics to the LRU buffer.

15. The method of claim 14, the N-dimensional image comprising a two-dimensional image.

16. The method of claim 14, further comprising:
compressing an output of the locally-adaptive, lossless palettization utilizing a one-dimensional technique to further reduce redundancies.

17. The method of claim 16, the one-dimensional technique comprising at least one selected from the group consisting of LZ77 compression and LZ78 compression.

18. The method of claim 14, further comprising:
ordering index values representative of the pixel characteristics from the non-matching macroblock lines in descending order of value; and
transmitting the index values, in order, utilizing a reduced set of representation bits derived from, at least in part, a total number of index values for a macroblock, a number of previously transmitted index values, and a value of a last index transmitted.

19. The method of claim 18, the reduced set of representation bits utilizing a bit count determined by:

$$\text{bit count} = \log_2(n+m-k+1) \quad \text{Eq. (4)}$$

where n is the value of the last index transmitted, m is the number of previously transmitted index values, and k is the total number of index values for the macroblock.

20. The method of claim 14, the pixel characteristics comprising at least one selected from the group consisting of pixel colors and pixel grayscales.

21. The method of claim 14, further comprising:
grouping like information to facilitate additional compression.

22. The method of claim 21, the like information comprising at least one selected from the group consisting of sequences of line bits, sequences of macroblock colors, and encoded macroblocks.

23. The method of claim 14, further comprising:
ordering encoded data to facilitate additional compression.

24. The method of claim 23, ordering encoded data comprising sequencing index values from greater to lesser values such that each successive transmission of information requires fewer bits to be transmitted.

25. The method of claim 14, the M×O size macroblocks comprising 8×32 pixel size macroblocks.

26. The method of claim 14, the L size LRU buffer comprising a 256 pixel size LRU buffer.

27. The method of claim 14, the threshold value comprising a value of approximately 16.

28. A computer-executable system that facilitates data compression, comprising the following means stored in a computer readable memory:
means for obtaining an N-dimensional image; and
means for compressing the N-dimensional image, utilizing lossless palettization by initializing an L size last recently used (LRU) buffer; splitting the N-dimensional image into M×O size macroblocks, where M and O each represent any integer from one to infinity; checking each macroblock line-by-line and pixel-by-pixel; setting masking bits if a line matches a previous line; setting masking bits if a pixel matches a previous pixel; creating a list of all pixel characteristics utilized in non-matching macroblock lines; encoding macroblock lines "as is" if pixel characteristics in non-matching macroblock lines is greater than a threshold value related to the pixel characteristics; encoding a list of used pixel characteristics utilizing, if possible, an index value from the LRU buffer instead of actual characteristic encoding; encoding a sequence of all pixels from non-matching macroblock lines by substituting pixel characteristics with its index value from the list of used pixel characteristics; and adding pixel characteristics from the list of used pixel characteristics to the LRU buffer.

29. A computer readable medium having stored thereon computer executable components comprising:
a computer-implemented system that facilitates data compression, comprising the following computer executable components:
a processor that receives an N-dimensional image, where N is any integer from one to infinity; and
The processor executing a compression component that utilizes, at least in part, locally-adaptive, lossless palettization to facilitate compression of the N-dimensional image, wherein the lossless palettization comprises: initializing an L size last recently used (LRU) buffer; splitting the N-dimensional image into M×O size macroblocks, where M and O each represent any integer from one to infinity; checking each macroblock line-by-line and pixel-by-pixel; setting masking bits if a line matches a previous line; setting masking bits if a pixel matches a previous pixel; creating a list of all pixel characteristics utilized in non-matching macroblock lines; encoding macroblock lines "as is" if pixel characteristics in non-matching macroblock lines is greater than a threshold value related to the pixel characteristics; encoding a list of used pixel characteristics utilizing, if possible, an index value from the LRU buffer instead of actual characteristic encoding; encoding a sequence of all pixels from non-matching macroblock lines by substituting pixel characteristics with its index value from the list of used pixel characteristics; and adding pixel characteristics from the list of used pixel characteristics to the LRU buffer.

30. A device employing the method of claim 14 comprising at least one selected from the group consisting of a computer, a server, and a handheld electronic device.

31. A device employing the system of claim 1 comprising at least one selected from the group consisting of a computer, a server, and a handheld electronic device.

* * * * *